Dec. 23, 1930.  J. A. FLOWERS  1,785,862
AUTOMATIC FEED FOR BURRING MACHINES
Filed Nov. 9, 1929
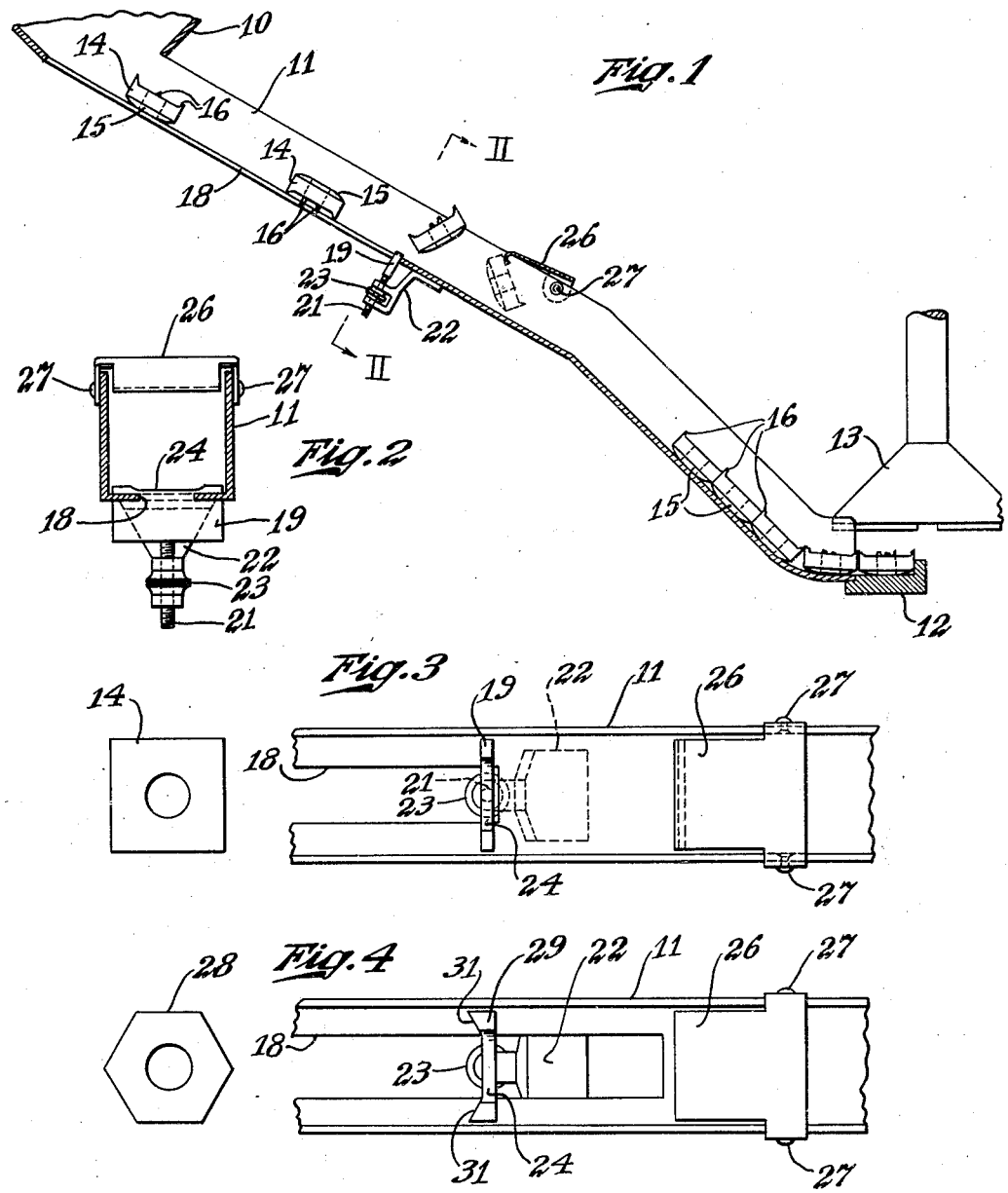

Patented Dec. 23, 1930

1,785,862

UNITED STATES PATENT OFFICE

JAMES A. FLOWERS, OF BIRMINGHAM, ALABAMA

AUTOMATIC FEED FOR BURRING MACHINES

Application filed November 9, 1929. Serial No. 406,120.

My invention relates to a feeding device for articles in course of manufacture to a finishing machine, more particularly of articles which have protuberances or burrs on one side thereof to be removed and has for its object the provision of apparatus of the character designated which shall be effective to cause the articles to pass to the finishing machine uniformly with the burrs or protuberances in proper position to be removed.

A further object of my invention is to provide an automatic feeding device to a burring machine of nut blanks coming from the press and which shall be effective to cause the nut blanks to be fed to the burring machine with the burrs thereon in proper position to be removed by the burring machine.

In carrying out my invention, I provide a chute down which the nut blanks are adapted to slide by gravity. Positioned in the chute, midway its ends, is a tripper means so arranged that the protuberances of nut blanks which are improperly turned engage the tripper means and turn over in response to their acquired momentum and move thenceforth by gravity to the burring machine with the protuberances in position to be removed. Nut blanks, which start down the chute in proper position pass the tripper means without turning over. Also positioned in the chute, below the tripper means, is a means for preventing the nut blanks from turning over more than once in the chute.

A device embodying features of my invention is illustrated in the accompanying drawings forming a part of this application, in which Fig. 1 is a sectional view showing one form of my invention;

Fig. 2 is a sectional view taken along line II—II of Fig. 1;

Fig. 3 is a plan view of the device shown in Figs. 1 and 2; and

Fig. 4 is a plan view of my invention as adapted to operate with hexagon nuts.

Referring to the drawings for a better understanding of my invention, I show a fragment of a hopper 10 which receives the nuts coming from the press, not shown. Connected to the lower end of the hopper 10 is a downwardly inclined chute 11 which terminates at its bottom adjacent a guide 12 positioned below the revolving head 13 of a burring machine.

Passing down the chute 11 are shown a plurality of nut blanks 14 each having protuberances or burrs 16 thereon which are to be removed by the head 13. It will be apparent that it is necessary for the burrs 16 to be turned uppermost for them to be acted upon by the head 13. In accordance with the standard practice, it will be noted that the nut blanks 14 are provided with a convexity or chamfer 15 on the side opposite the protuberances 16. The chute 11 is at such an inclination that the nut blanks 14 slide down by gravity. In the upper end of the chute 11, in the bottom thereof, is provided a slot 18 to allow burrs in the centers of the nut blanks to extend down into the slot and insure that the nut blanks are supported by the sides of the slot to be engaged by the tripper means about to be described.

At the lower end of the slot 18 I position a tripper bar 19 which extends across the bottom of the chute 11 slightly above the surface of the bottom in the path of the nut blanks 14. The tripper bar 19 is provided on its lower end with a screw 21 which extends through a bracket 22 secured to the lower side of the chute and a nut 23 on the screw 21 coacts with the bracket 22 to adjustably support the tripper bar 19. As may be seen in Fig. 2, the tripper bar 19 is provided with a central notch 24 and the sides extend above the bottom of the chute only a small amount so that when nut blanks with the burrs uppermost slide down the chute, the chamfered edges ride over the sides of the tripper bar and the raised portion or crown clears the notch 24 and such nut blanks slide on down the chute without being turned over.

The chute 11, as seen in Fig. 3, is of such width that the nut blanks 14 slide freely therein but can not turn around in the chute. As the nut blanks slide down the chute, as may best be seen in Fig. 1, those with the chamfer 15 uppermost are caught by the tripper bar 19 and are turned over with the chamfer downwards. This will occur whether or not there are any burrs on the nut blanks. Below the tripper bar 19, I pivotally mount a light sheet metal barrier 26 on the upper part of the chute 11 at 27, in position such that any nut blanks which may start to turn over more than once strike it and return to their proper positions.

In Fig. 4 I show my invention as adapted for turning hexagon nut blanks 28. As in the forms shown in Figs. 1 to 3, the chute 11 is made of such width as to accommodate the nut blank 28 and not permit them to turn around. In accordance with this modification I provide a tripper bar 29 adjustably mounted as before described and provided on its upper side with an inclined face 31 corresponding to the angle of the sides of the nut blanks 28. In all other respects, this modification of my invention operates in the same manner as already described.

From the foregoing it will be apparent that I have devised an improved feed device for nut blanks for a burring machine which is simple of design, reliable in operation and by means of which the nut blanks are turned over to their proper positions in response to acquired momentum in sliding down an inclined chute.

While I have shown my invention in but two forms, it will be obvious to those skilled in the art that it is not so limited but is susceptible of various other changes and modifications without departing from the spirit thereof and I desire therefore that only such limitations shall be placed thereupon as are imposed by the prior art or as are specifically set forth in the appended claims.

What I claim is:

1. In apparatus of the character described, an inclined chute down which articles are adapted to slide by gravity, and a tripper in the bottom of the chute positioned to engage downwardly projecting protuberances on said articles during their movement down the chute, and in response to the acquired momentum of the articles cause them to turn over in the chute.

2. In apparatus of the character described, an inclined chute down which articles are adapted to slide by gravity, and a tripper in the bottom of the chute positioned to engage downwardly projecting protuberances on said articles during their movement down the chute and in response to the acquired momentum of the articles cause them to turn over in the chute, and means for preventing the articles from turning over more than once in the chute.

3. In apparatus of the character described, an inclined chute down which articles are adapted to slide by gravity, a tripper in the bottom of the chute positioned to engage downwardly projecting protuberances on said articles during their movement down the chute, and in response to the acquired momentum of the articles cause them to turn over in the chute, and a member pivoted to the upper side of the chute below the tripper in position to engage articles which start to turn over more than once in the chute.

4. In a feed device to a finishing machine of articles having a chamfered or convex side and a flat side, said finishing machine being positioned to operate on said articles with the flat side uppermost, an inclined chute down which the articles are adapted to slide by gravity, and tripper means in the bottom of the chute positioned to engage downwardly disposed flat sides of such articles and effect a turning over thereof in response to their acquired momentum, said tripper means being of such height that articles with the chamfered side downwards slide thereover.

5. In a feed device to a finishing machine of articles having a completed chamfered or convex side and a flat side, said finishing machine being positioned to operate on said articles with the flat side uppermost, an inclined chute down which the articles are adapted to slide by gravity, tripper means in the bottom of the chute positioned to engage downwardly disposed flat sides of such articles and effect a turning over thereof in response to their acquired momentum, said tripper means being of such height that articles with the chamfered side downwards slide thereover, and means for adjusting the height of the tripper means.

6. In a feed device to a finishing machine of articles having a completed chamfered or slightly convex side and a flat side, said finishing machine being positioned to operate on said articles with the flat side uppermost, an inclined chute down which the articles are adapted to slide by gravity, tripper means in the bottom of the chute positioned to engage downwardly disposed flat sides of such articles and effect a turning thereof in response to their acquired momentum, said tripper means being of such height that articles with the chamfered side downwards slide thereover, means for adjusting the height of the tripper means, and yieldable means arranged on the upper side of the chute below the tripper means to prevent articles from turning more than once.

7. In a feed device for delivery nut blanks each having a flat side and a chamfered side to a burring machine, a chute along which the nut blanks are adapted to slide, and a tripper bar extending across the bottom of the chute to engage the flat sides of the nut blanks which are turned downwards and effect a turning over of said blanks.

8. In a feed device for delivering nut blanks to a burring machine, said nut blanks having flat and chamfered sides, a chute along which the nut blanks are adapted to slide, and a tripper bar extending across the bottom of the chute to engage the flat sides of the nut blanks which are turned downwards and effect a turning over of said blanks, said tripper bar being so disposed that nut blanks with the chamfered side downwards slide over the tripper means without being turned over.

9. In a feed device for delivering nut blanks to a burring machine, said nut blanks having flat and chamfered sides, a chute along which the nut blanks are adapted to slide and a tripper bar extending the bottom of the chute to engage the flat sides of the nut blanks which are turned downwards and effect a turning over of said blanks, said tripper bar being so disposed that nut blanks with the chamfered sides downwards slide over the tripper bar without being turned over, said chute having a burr receiving slot in the bottom thereof above the tripper bar.

10. In a feed device for delivering nut blanks to a burring machine, said nut blanks having flat and chamfered sides, a chute along which the nut blanks are adapted to slide, a tripper bar extending across the bottom of the chute to engage the flat sides of the nut blanks which are turned downwards and effect a turning over of said blanks, said tripper bar being so disposed that nut blanks with the chamfered sides downwards slide over the tripper means without being turned over, said chute having a burr receiving slot in the bottom thereof above the tripper bar, and means for adjusting the height of the tripper bar.

In testimony whereof I affix my signature.

JAMES A. FLOWERS.